(12) United States Patent
Morita et al.

(10) Patent No.: US 7,071,145 B2
(45) Date of Patent: *Jul. 4, 2006

(54) THERMOSENSITIVE RECORDING MATERIAL, AND SYNTHESIS METHOD OF OLIGOMER COMPOSITION FOR THE RECORDING MATERIAL

(75) Inventors: Mitsunobu Morita, Numadu (JP); Kunio Hayakawa, Mishima (JP); Masafumi Torii, Yokohama (JP); Mitsuru Naruse, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/961,509

(22) Filed: Oct. 7, 2004

(65) Prior Publication Data
US 2005/0079976 A1    Apr. 14, 2005

Related U.S. Application Data

(63) Continuation of application No. 10/255,729, filed on Sep. 25, 2002, now Pat. No. 6,878,671.

(30) Foreign Application Priority Data

| Sep. 25, 2001 | (JP) | P2001-290448 |
| Jan. 29, 2002 | (JP) | P2002-020791 |
| Jul. 24, 2002 | (JP) | P2002-215561 |

(51) Int. Cl.
    B41M 5/20    (2006.01)

(52) U.S. Cl. ............... 503/216; 503/207; 503/225

(58) Field of Classification Search ............... 503/207, 503/216, 225, 200, 226
See application file for complete search history.

(56) References Cited

U.S. PATENT DOCUMENTS

| 4,904,635 | A | * | 2/1990 | Tamagawa et al. ......... 503/207 |
| 5,464,804 | A | | 11/1995 | Kawakami et al. |
| 5,942,377 | A | | 8/1999 | Torii et al. |
| 5,955,225 | A | | 9/1999 | Furuya et al. |
| 5,981,115 | A | | 11/1999 | Furuya et al. |
| 6,060,427 | A | | 5/2000 | Mori et al. |
| 6,090,192 | A | | 7/2000 | Torii et al. |
| 6,090,748 | A | | 7/2000 | Furuya et al. |
| 6,154,243 | A | | 11/2000 | Tatewaki et al. |
| 6,174,836 | B1 | | 1/2001 | Hotta et al. |
| 6,180,560 | B1 | | 1/2001 | Hayakawa et al. |
| 6,207,613 | B1 | | 3/2001 | Torii et al. |
| 6,261,992 | B1 | | 7/2001 | Furuya et al. |
| 6,362,130 | B1 | | 3/2002 | Hotta et al. |
| 6,400,492 | B1 | | 6/2002 | Morita et al. |
| 6,693,061 | B1 | | 2/2004 | Shimbo et al. |

FOREIGN PATENT DOCUMENTS

| EP | 1116713 | 7/2001 |
| GB | 1444120 | 7/1976 |
| JP | 401291981 | * 11/1989 |
| JP | 405201137 | * 8/1993 |
| JP | 8244355 | 9/1996 |

OTHER PUBLICATIONS

Claims, Drawings and Amendment of U.S. Appl. No. 09/470,959, filed on Dec. 22, 1999.
Claims, Drawings and Amendment of U.S. Appl. No. 09/497,947, filed Feb. 4, 2000.
Claims of U.S. Appl. No. 09/547,493, filed on Apr. 12, 2000.
Claims of U.S. Appl. No. 09/655,505, filed Sep. 5, 2000.
Claims, Drawings and Preliminary Amendment of U.S. Appl. No. 09/680,718, filed Oct. 6, 2000.
Claims, Drawings and Preliminary Amendment of U.S. Appl. No. 09/689,523, filed oct. 12, 2000.
U.S. Appl. No. 09/694,000, filed on Oct. 23, 2000.
U.S. Appl. No. 09/741,339, filed Dec. 21, 2000.
Claims, Drawings and Preliminary Amendment of U.S. Appl. No. 09/768,724, filed Jan. 24, 2001.
Claims, Drawings and Preliminary Amendment of U.S. Appl. No. 09/771,129, filed Jan. 26, 2001.
U.S. Appl. No. 09/989,029, filed on Nov. 21, 2001.
Claims of U.S. Appl. No. 10/104,121, filed Mar. 21, 2002.

* cited by examiner

*Primary Examiner*—Bruce H. Hess
(74) *Attorney, Agent, or Firm*—Cooper & Dunham LLP

(57) ABSTRACT

A thermosensitive recording material comprising a thermosensitive layer provided on a substrate, and the thermosensitive layer comprises as main ingredients a leuco dye and a developer to make colored state of said leuco dye when heated, wherein the developer is an oligomer composition obtained from the reaction of a polyvalent isocyanate compound represented by following Formula (I) with an aromatic amine represented by following Formula (II);

$X(NCO)_a$     Formula (I)

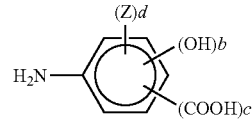

Formula (II)

where X represents a try- or more-valent group, a represents an integer numeral of 3 or more, b and c represent respectively integer numerals in the range of 0 to 5 and they satisfy a relation of b+c=1 to 5, Z represents hydrogen atom, alkyl group, allyl group or aryl group, and the aryl group may include condensed ling structure thereof, and d represents an integer numeral in the range of 0 to 4. This developer shows excellent reliabilities of both image and background area, and also shows an excellent color-developing characteristics (color developing sensitivity and image density).

12 Claims, No Drawings

THERMOSENSITIVE RECORDING MATERIAL, AND SYNTHESIS METHOD OF OLIGOMER COMPOSITION FOR THE RECORDING MATERIAL

CROSS-REFERENCE TO RELATED APPLICATIONS

This application is a Rule 1.53(b) Continuation Application of U.S. Ser. No. 10/255,729, filed Sep. 25, 2002, now U.S. Pat. No. 6,878,671 the entire contents of which is herein incorporated by reference.

BACKGROUND OF THE INVENTION

1. Field of the Invention

The present invention relates to a thermosensitive recording material improved in image reliability (durability for discoloring or fading by plasticizer and oily materials) and in reliability in background area (for coloring or tinting of background area). Further the present invention relates to a thermosensitive recording material which is capable of exhibiting a significantly improved color-developing characteristics, with high reliabilities in said both image and background area. And more, the present invention relates to a synthesis method of an oligomer composition which is useful for the thermosensitive recording material.

2. Description of the Related Art

In general, the thermosensitive recording material has a thermosensitive recording layer which is mainly composed by an electron-donor colorless or lightly colored dye precursor as colorant and electron-acceptor compound as color-developer, and which is selectively heated by a thermal head, a thermal pen, laser beams or the like devices, thereby the dye precursor (leuco dye) and color-developer in heated point are instantaneously reacted with, causing recorded images, as described in Japanese Examined Patent Publications of Tokkou Shou 43-4160 and Tokkou Shou 45-14039 and other documents. These thermosensitive recording materials can record images thereon using a machine with relatively simple mechanism thus is easier in maintenance, lower in noises generated, therefore in recent years these thermosensitive recording materials being utilized as recording material for various and wide applications including computer, facsimile, automatic ticket issuing system, labeling system, thermal recorder and other machines.

As described above, the thermosensitive recording material uses in general a electron-donor colorless or lightly colored dye precursor as colorant and electron-acceptor compound as color-developer, therefore has a good appearance, an agreeable touch, and a high optical density of developed image, on the other hand it has drawbacks that the recorded images are apt to discolor or be lowered in optical density if they are contacted with the surfaces of plastic materials such as polyvinyl chloride sheet or film, owing to the action of plasticizer or additives contained therein, or they are easily declined in image density or easily colored or tinted in background area if the images are contacted with foods and cosmetics and the like, owing to the action of chemicals contained therein.

Accordingly, for improving the storage stability of recorded images of the thermosensitive recording material, many works to research and to develop favorable color developers have been extensively carried out, and many compounds of various types materials as developers have been proposed. One of such kind proposals have been made in recent year which is a proposal for employing a compound having urea group. For instances, Japanese Unexamined Patent Publications of Tokkai Hei 8-2110 and Tokkai Hei 8-2111 disclose the use of diphenyl-urea compounds. These compounds exhibit more excellent storage stability in the recorded images than that caused by conventional phenol developers, however they show a tendency declining the density of recorded image when the image is contacted with plasticizer, therefore it is difficult to say that these compounds result a sufficient image reliability. In addition, system by these compounds has a drawback that the developed color density is low, thus these compounds do not place the performance of image quality in real use level.

With regard to the use of a compound having urea group and urethane group, Japanese Unexamined Patent Publications of Tokkai Shou 8-2110 and Tokkai Shou 8-2111 disclose the use of a compound having urea-urethane group. This compound also causes more excellent storage stability of recorded images than that caused by conventional phenol developers, however it also shows a tendency declining image density when the image is contacted with plasticizer, therefore it is difficult to say that a sufficient reliability in image storage ability is attained by the use of the compound, thus similar as the case of aforementioned compounds, this compound does not make the arrival of image quality to real use level.

On the other hands, a compound having two urea groups and two salicylic acid residues in the molecule structure is disclosed in Japanese Unexamined Patent Publication of Tokkai Hei 8-244355, and a compound having two urea groups and two benzoic acid residues in the molecule structure is also disclosed in Japanese Unexamined Patent Publication of Tokkai Hei 8-197851, and a compound having two urea groups and two hydroxy phenyl residues in the molecule structure is also disclosed in Japanese Unexamined Patent. Publication of Tokkai Hei 8-2109. These compounds show a tendency to improve image density owing to the influence of introduced groups which are other ones than the urea group and have a color-developing competency, however they also show a tendency declining image density when the image is contacted with plasticizer, therefore are it is difficult to say that sufficient image reliability can be caused by the use of these compounds, thus similarly as aforementioned compounds these compounds do not make the arrival of image quality to real use level.

Japanese Unexamined Patent Publication of Tokkai Hei 11-115314 discloses a use of poly-urea compounds derived from diisocyanate compounds and diamine compounds. These poly-urea compounds are composed in a polymer having large molecular weight, therefore they are low in color-developing competency and hence they are not ones having quality of practical use level.

Further Tokkai Hei 5-169836 discloses a compound having —$SO_2$—NHCONH— group, and Tokkai Hei 11-263769 discloses a compound having —$SO_2$—NHCONHCONH— group, both which are analogous to a compound having urea group. Improvements of image density were intended by these compounds, but the storage stability of developed image is not sufficient or coloring or tinting in back ground area is noticeable in either cases, hence they are not positioned in practical use level.

On the other hands, under the concept for applying the compound having an increased molecular weight, various kinds of high molecular (oligomer) of color-developers have been proposed. As typical examples, products of condensation reaction of 4-hydroxy benzoic acid with polyalcohols shown in Japanese Unexamined Patent Publication of Tokkai2001-30626 and WO99/51444 which corresponding to EPO 987122 can be instanced. However, these oligomer type color-developers cause insufficient results in both storage stabilities of images and in storage stability of background area, therefore are not suitable for real use. Still, there are provided cross-linked diphenyl sulfone compounds in a Japanese Unexamined Patent Publication of Tokkai Hei 10-29969. These compounds show a relatively high reliability in image stability but poor color-developing characteristics (image density and color-developing sensitivity), and they have a distribution of molecular weights and contain low molecularly compounds therein which cause large fogging or tinting in background area thus are not suitable for real use.

Furthermore, for the purpose to compensate drawbacks in above mentioned various developments, these are still proposed combination uses with one kind of compound as phenollic compounds, thereby color-developing characteristics (image density and color-developing sensitivity) and performance were intended to be improved, however in any case, as an inverse effect of improved color-developing characteristics, decreases in image reliability and in reliability of background area are induced, thus causing degradation from real use quality level.

Accordingly, hitherto, proposal of practical use level has not yet been attained in connection with color-developer showing excellent storage stabilities in both image and in background area, and showing excellent color-developing characteristics (image density and color-developing sensitivity).

SUMMARY OF THE INVENTION

It is hence an object of the present invention, in view of the situation of above descried prior arts, is to provide a thermosensitive recording material which has excellent reliabilities in both obtained image and in background area and furthermore showing excellent color-developing characteristics (image density and color-developing sensitivity). In particular, the object of the present invention is to, provide a thermosensitive recording material which is very suitable for practical use, by achieving compatible states of excellent reliabilities in image and background area with an excellent color-developing characteristics, at a high level which having not been achieved by prior arts.

Above and other objects of the present invention are achieved by provide of (1) a thermosensitive recording material comprising a thermosensitive layer provided on a substrate, and the thermosensitive layer comprises a leuco dye and a color developer wherein the color developer is an oligomer composition obtained from the reaction of a polyvalent isocyanate compound represented by following Formula (I) with an aromatic amine represented by following Formula (II);

X(NCO)$_a$  Formula (I)

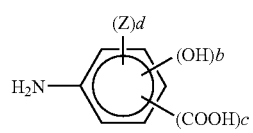

Formula (II)

in which X represents a tri- or more-valent group, $a$ represents an integer numeral of 3 or more, b and c represent respectively integer numerals in the range of 0 to 5 and they satisfy a relation of b+c=1 to 5, Z represents hydrogen atom, alkyl group, allyl group or aryl group, and the aryl group may include condensed ring structure thereof, and d represents an integer numeral in the range of 0 to 4.

Also above and other objects of the present invention are achieved by (2) the thermosensitive recording material according to above mentioned paragraph (1), wherein the X in the Formula (I) is tri-valent structure represented by following Formula (III) or Formula (IV);

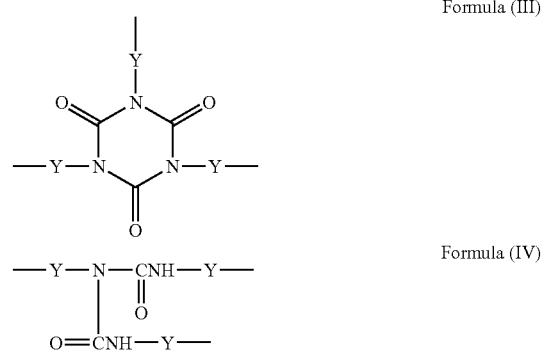

where Y represents a di-valent group.

Also above and other objects of the present invention are achieved by (3) the thermosensitive recording material according to above mentioned paragraph (1), wherein the aromatic amine represented by the Formula (II) is an amino salicylic acid derivative represented by following Formula (V);

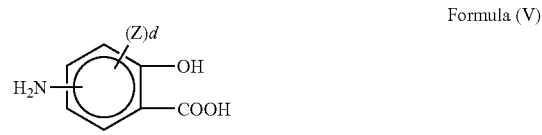

where Z and d have the same meanings as that of above described Z and d, respectively.

In addition that, the present invention provides (4) a thermosensitive recording material comprising a thermosensitive layer provided on a substrate, and the thermosensitive layer comprises a leuco dye and a compound to be used as developer to make a colored state of said leuco dye when heated, wherein the color developer is a mixture of an oligomer composition and other developer; and the oligomer composition is one obtained from the reaction of a polyvalent isocyanate compound represented by following Formula (I) with an aromatic amine represented by following Formula (II);

X(NCO)$_a$  Formula (I)

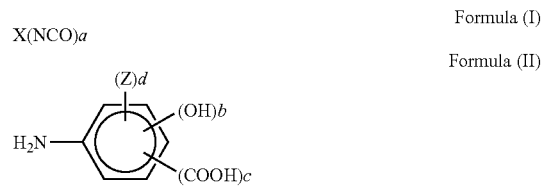

Formula (II)

in which X represents a tri- or more-valent group, a represents an integer numeral of 3 or more, b and c represent respectively integer numerals in the range of 0 to 5 and they satisfy a relation of b+c=1 to 5, Z represents hydrogen atom, alkyl group, allyl group or aryl group, and the aryl group may include condensed ring structure thereof, and d represents an integer numeral in the range of 0 to 4.

And according to the present invention, there is provided (5) the thermosensitive recording material according to above paragraph (4), wherein the other developer to be used in combination with the oligomer composition is 2,4'-bis-hydroxydiphenyl sulfone.

And also provided one is (6) the thermosensitive recording material according to above paragraph (4), wherein the ratio of the oligomer composition and the other developer is in the range of 2/8 to 5/5 by weight.

And further provided one is (7) the thermosensitive recording material according to above paragraph (4), wherein an adhesive layer is being provided on the opposite side of the thermosensitive layer with regard to the substrate.

Still another provided is (8) a synthesis method of an oligomer composition which is obtained from a reaction of a polyvalent isocyanate compound with an aromatic amine, wherein the reaction is conducted in ethyl acetate, and the polyvalent isocyanate compound is one represented by following Formula (I), and the aromatic amine is one represented by above described Formula (II);

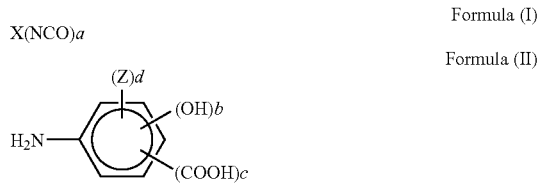

in which X represents a tri- or more-valent group, a represents an integer numeral of 3 or more, b and c represent respectively integer numerals in the range of 0 to 5 and they satisfy a relation of b+c=1 to 5, Z represents hydrogen atom, alkyl group, allyl group or aryl group, and the aryl group may include condensed ring structure thereof, and d represents an integer numeral in the range of 0 to 4.

Still further provided one is (9) the synthesis method of the oligomer composition according to above paragraph (8), wherein the X in the Formula (I) is a tri-valent structure represented by Formula (III) or Formula (IV).

Still further provided one is (10) the synthesis method of the oligomer composition according to above paragraph (8), wherein the aromatic amine represented by the Formula (II) is an amino salicylic acid derivative represented by above described Formula (V).

The thermosensitive recording material of the present invention is excellent one in both reliabilities of obtained image and background area and furthermore showing excellent color-developing characteristics (image density and color-developing sensitivity), furthermore, it is possible to obtain a significantly improved color-developing characteristics (image density and color-developing sensitivity), with keeping high reliabilities of the obtained image and background area, when the compound used as developer of a mixture of an above mentioned oligomer composition and other developer.

These characteristics are ones specifically being realized by the oligomer composition of the present invention which is produced by a reaction of a specific polyvalent isocyanate compound represented by above described Formula (I) with a specific aromatic amine represented by above described Formula (II). The words of 'the reaction' described in here means a plural of reactions which may be concurrently or sequentially progressed. Namely, there are included a plural of reactions such as a reaction between isocyanate group (NCO) of the tri- or more-valent isocyanate compound and amino group of the amine compound, a reaction between the isocyanate group and hydroxy group (OH group) and/or carboxy group (COOH group) which are substituents in the amino compound, a reaction between mutual isocyanate groups, a reaction between produced urea group and isocyanate group, and so forth reactions. These reactions comprise the first step reactions from source materials and other reactions which are subsequently progressed after the first step reactions, and these reactions can form the oligomer compound of the present invention which has a shape spread to three dimensional directions. Among these, the fastest reaction velocity is the reaction between isocyanate group (NCO) and amino group, and progressing degree of each of other reactions can be adjusted by selecting the reaction conditions (reaction temperature, reaction time of period, concentration, type and quantity of solvent, mixing ratio of source materials, charging periods thereof, and other conditions). It is considered that other reactions than the reaction between isocyanate group (NCO) and amino group are progressed in a certain degree of the reaction ratio, thereby oligomer having large molecular weight can be obtained in the present invention. In general, with regard to oligomer, there are various definitions, therefore the precise doctrine is not necessarily existence, however the present invention designates one having a molecular weight in the range of more than 2000 to less than 10000 as the oligomer, hence the compounds of the present invention which being in this range reveals specific performances.

As aforementioned, the novel oligomer composition for recording material proposed by the present invention is a reaction product obtained from the reaction between the specific polyvalent isocyanate compound represented by above described Formula (I) and the specific aromatic amine represented by above described Formula (II). Also the present invention proposes two kinds of novel reaction products for recording material in which the X in the Formula (I) is a try-valent structure represented by above described Formula (III) or Formula (IV)

the oligomer composition used for color-developer in the present invention is a compound formed by reaction between the specific polyvalent isocyanate compound represented by the Formula (I) and the specific aromatic amine represented by the Formula (II), and very important meaning with the oligomer composition is there in the points of that the aromatic amine for composing the oligomer composition contains phenollic hydroxy goup(s) and/or aromatic carboxyl group(s), and isocyanate of Formula (I) is polyvalent isocyanate.

Generally speaking, with regard to the reaction between isocyanate group (NCO group) and amino group (NH$_2$ group), it is thought that condensation reactions for forming urea groups (NHCONH groups) are prevailingly progressed, then condensation reactions between the formed urea groups (NHCONH groups) and isocyanate groups (NCO groups), and reaction between mutual isocyanate groups are also concurrently progressed.

However in case of the present invention, it is thought that there are an existence of sufficiently active groups (phenollic OH group and/or aromatic COOH group), although they are poorer active than that of amino group, condensation reaction between these groups and isocyanate groups are progressed in a certain degree of the reaction ratio, producing the oligomer, And in this case, it is also thought as for structural characteristics of the oligomer that the obtained oligomer product has mother core of polyvalent isocyanate which is tri- or more-valent one therefore the oligomer product inevitably has structures spreading to three dimensional directions, and color-developing competency groups (phenollic OH group and/or aromatic COOH group), which are stronger than urea group, are inevitably existed at side ends thereof, and these strong color-developing competency groups are also existed in the middle of every structures.

And it is thought that these characteristics lead an expression of image reliability, an expression of higher color-developing competency than that of other urea compound color-developer, and more, an expression of more specific natures (significantly improved color-developing characteristics (image density and color-developing sensitivity) with keeping high reliabilities of obtained image and background area) when the ologomer is used as a mixture with other developer. The oligomer composition of the present invention, if it is used alone, shows very high image reliabilities (no discoloring in images by contacting with plasticizer and other chemicals), and high reliabilities in background area, hence has a characteristic which is hard to tinting or coloring of background area under the various circumstances.

Further, excellent points of the oligomer of the present invention are revealed in case of use together with other color-developer. Namely, by combination use thereof with other color-developer (for instance usual phenollic color-developer), as featuring points in comparison with single use thereof also can be mentioned that color-developing characteristics (image density and sensitivity) are significantly improved, at the same time, reliabilities in image and background area are kept at very high levels. In general, there is a tendency that the use of color-developer showing high image-reliability together with usual phenollic color-developer (which shows low image-reliability) causes an improved color-developing characteristic, and in conversely causes a lowered image-reliability.

However, the oligomer composition of the present invention keeps the quality of produced image at a high reliability level, even if it is used together with usual phenollic color-developer, and can maintain a higher image density than that presented by single use thereof, which is proved by a plasticizer-proof test.

It is considered that this result is conducted from a base that the ologomer of the present invention forms a specific color-developed state including leuco dye used, in the use together with usual phenollic color-developer. While the structural nature of color-developed state is not fully clarified yet, but it is considered at the present moment that a specific figure of structure are formed by the oligomer composition of the present invention which is an oligomer having structures extended to three dimensional directions and having color-developing competency groups at side ends thereof. And more, a high level of reliability of background area is maintained by this combination use of both color-developers. And another specific tendency is noticeable that the compatibility with the improved color-developing characteristic is realized. While clear reason causing this state is uncertainty too at the moment, but it is considered that this is also conducted specifically by a specific structural figure of the oligomer of the present invention.

As described above, the oligomer used as color-developer in the present invention shows specific characteristics as aforementioned, which are caused by a synergetic effect of (i) they are a composition form, (ii) their molecular structure are not linear but three bulky shape of structures extending to three dimension directions, (iii) they inevitably have a strong color-developing competency group (phenollic OH group or aromatic COOH group) at side end of each structure, and (iv) these strong color-developing competency groups are also existed in the middle of structures and the like function, and these functions are different from that shown prior arts.

These specific and excellent functions of the oligomer used in the present invention should be clear from the data shown in below Examples and Comparative Examples, differences in occurred functions from that of prior arts are roughly considered as follows.

Namely, color-developing compounds denoted in Japanese Unexamined Patent Publications of Tokkai Hei 8-244355, Tokkai Hei 8-197851 and Tokkai Hei 8-2109 are diisocyanates such as di-valent isocyanates having amino salicylic acid group, amino benzoic acid group, or amino phenol group combined to the isocyanates. These compounds are ones of structures described in above each Publication, which are differ from the oligomer compound of the present invention, and even if the diisocyanates are formed in oligomeric structures by a progressed condensation reaction, their structures are linear shapes extended from mother diisocyanate cores which are differ from three dimensional structure, thus can not show above mentioned characteristics of the ologomer compound of the present invention. As a result, the conventional diisocyanates has low durability for plasticizer, and they are poor for humidity heat hence apt to tint or color in backgound area when they are used together with other color-developer, thus there is a tendency of low reliability for background area by the use thereof. Further, poly-urea compounds disclosed in Tokkai Hei 11-115314 are high molecular ones (polymers) prepared by polymerization reaction diisocyanate compounds and diamines, and they are very poor in color-developing natures, and they have linear structures which have no three dimensional extent, thus they are differed from the oligomer of the present invention in mutual structures, therefore they can not exhibit the specific characteristics as that of the oligomer.

(2) There are proposed urea-urethane compounds in Japanese Unexamined Patent Publication of Tokkai 2000-143611 and WO 00/14058. These compounds include urea groups (NHCONH) and urethane groups (NHCOO) in their moleculars, and they are ones derived from reactions of hydroxyl groups (OH) and amino groups ($NH_2$) for isocyanate compounds. There are proposed by these Patent publications various types of urea-urethane compounds denoted by five kinds of general formulas, and source materials (isocyanate compounds, hydroxyl group-containing compounds, amino group-containing compounds), synthesis methods and examples of synthesis are also described. These compounds seem to exhibit the specific characteristics as color-developers by account of urea groups and urethane groups included in their moleculars, and for the sake of leaving the both functional groups in the molecular prepared, they are synthesized by step wise reactions of hydroxyl group-containing compounds and amino group-containing compounds with diisocyanate compounds. Furthermore, no urethane group is produced when more reactive other functional group is there in the hydroxyl group-containing compounds employed, therefore source compound having such a plural of functional group can be not employed. Besides this, denoted examples of amino compounds are mainly ones having no other functional group than amino group. On the other hand, while other compounds such as aminophenol and amino benzoic acid are denoted, however these compounds have actually not benn employed in Examples, because probably, their natures are strongly concerned to above mentioned synthesis schemes, thus amine compounds and hydroxyl group-containing compounds to be employed in the actual reaction are necessarily limited. Namely, it is considered that an isocyanate group positioned in one side of molecular structure of di- or more-valent isocyanate compounds (every tangible examples shown are whole of di-valent isocyanates) is reacted at first step to form urea group or urethane group, then at next step, remaining isocyanate groups positioned in other sides are reacted to form urea groups or urethane groups, therefore successive reactions such as chain reaction are not allowed, hence can not produce the polymer (oligomer) composition. And as aforementioned, there are descriptions in these Specifications to be interpreted that tri-valent isocyanate compounds other than di-valent isocyanate compounds are also possible to use as the source isocyanate. However no disclosure is provided in the Specifications with regard to what specific kinds, structures and natures of color-developers are made from such tri-valent isocyanate compounds as source materials and to what degree of effects are caused using the obtained color-developers. Further, also no description is provided in the Specifications with regard to synthesis methods of the corresponding color-developers by tri- or more valent isocyanates which are thought to be more complicated progresses than that by di-valent isocyanate. In contrast to this, the present invention obtains the oligomer composition from the reaction of tri- or more-valent isocyanate represented by the Formula (I) and amine compound represented by the Formula (II), and the reaction is complicated one, therefore is required to control it by adjusting various reaction conditions such as reaction temperature, reaction time of period, concentration, type and quantity of solvent, mixing ratio of source materials, charging periods thereof, and other conditions. And more, other treatment to recover the oligomer composition is required.

Furthermore, other descriptions are provided that the compounds having urea groups and urethane groups of increased number (3 to 10), and methods for yielding them which are obtained by reactions with polyvalent amine compounds or polyvalent alcohols (phenols). However, still in this case, isocyanate compounds to be reacted with polyvalent amine compounds or polyvalent alcohols (phenols) are mono-functional isocyanates because isocyanate group positioned in one side of molecular structure of the isocyanate compound already having been reacted, thus is no progress of chain reaction, therefore merely compounds having large molecular weight corresponding to the function number of the polyvalent amine compounds and multivalent alcohols (phenols) are simply produced. The Publication of WO 00/14058 mentions molecular weights of 5000 or less, favorably 2000 or less. It is considered that there is no progress of chain reaction (polymerization reaction) in any case, therefore is difficult to obtain compounds having molecular weight corresponding to polymer (oligomer). Actually, compounds having larger molecular weights among all embodiment Examples surely shown are ones having molecular weight of at most about 900 to 1000. In addition that, these compounds are derived from di-valent isocyanates, therefore they are linear structures, thus differ from the oligomer composition of the present invention in structural feature.

In contrast to that, the oligomer composition of the present invention is a product from reaction of tri- or more-valent isocyanate compound with a compound represented by Formula (II) having different two or more groups in which one group is invariably amino group, therefore it is considered that condensation reactions are progressed successively like as chain reaction, because various kinds and velocities reactions of isocyanate groups with other groups than amino groups are occurred successively, in adition to reactions of isocyanate groups with amino groups. Actually, as a result of determination of relative molecular weights (computed by polyethylene glycol) of the color-developers of the present invention by GPC method, molecular weights of 3000 to 6000 were recorded which are values to be said as oligomer compounds. Furthermore, these compounds are ones derived from tri- or more-valent isocyanates, therefore they have oligomer structures extended to three dimensional directions, and in which phenollic OH group and/or aromatic COOH group is surely existed at every side end of each extended structure, it hence differs from aforementioned urethane compounds. And in addition, there is another specific point of the oligomer of the present invention that a more improved characteristic can be attained in case of said isocyanate is a polyvalent isocyanate. It is considered as reason of such improvement was attained that these compounds of the present invention contain strong polar groups positioned in side end of each extended structure and (CO—N—CO, N—CO—N) in mother core structures, in addition to above mentioned characteristics. It is considered as a reason to be exhibited such phenomena that the oligomer composition of the present invention contains urea groups, and has oligomer structures extended to three dimensional directions, and further contains strong color-developing competency groups existed in every side ends of each extended structure, and thereby exhibits specific characteristics differed from that of prior arts, and furthermore, they can exhibit more specific and improved characteristics if they contain strong color-developing competency groups in the middle of mother core structures.

(3) Thermosensitive recording material which uses an oligomer composition material as a color-developer but which is one obtained from a reaction of the polyvalent isocyanate of tri- or more-valent one having aforementioned Formula (I) with an aromatic amine having no substituent other than amino group (for example aniline) shows tendencies of poorer color-developing nature and more declined reliability of images and more decreased reliability of background area which are exhibited as decreased image density and increased density at background area proved by plasticizer-proof test and heat resistance test, in comparison with the performance of thermosensitive recording material of the present invention using the oligomer composition of the present invention. And in case of combination use with other color-developer, it shows a tendencies of declined reliabilities of images exhibiting decreased image density proved by plasticizer-proof test, and decreased image density and significantly increased fogging (tinting or coloring) of background area proved by heat resistance test. As explained above, in case of aromatic amine use (for example aniline use) which differs from the amine used in the present invention, it is considered that there is no formation of the oligomer structure extending three dimensional directions and as well no existence of color-developing competency groups at every side ends of the molecular structure, both are formed in case of the present invention by condensation reaction using phenollic OH group and/or aromatic COOH group for example of benzoic acid, namely, structure similar as that of the oligomer in the present invention is not formed, therefore declined color-developing nature and declined reliabilities of images are led, and in case of combination use with other color-developer, a tendency of significantly increased fogging (tinting or coloring) of background area is also led. These facts clearly reveal that specific characteristics of the oligomer of the present invention are exhibited by structural features thereof.

(4) WO 99/51444 and Japanese Unexamined Patent Publication of Tokkai Hei 10-29969 propose so-called polymer type (oligomer type) color-developers. These color-developers become to different in the characteristic according to structural natures thereof, and for example when oligomer type color-developer disclosed in the WO 99/51444 is used, tendencies are shown that declined reliabilities of background area causing a density increase of background area which are shown by plasticizer proof test and humidity-resistance test, in addition to a decrease of image density and a low reliability which are also shown by plasticizer-proof test. These points are possible to improve in a limited scope by adjusting molecular weight and the like means, however essential improvement is difficult, thus achievements of coloring characteristic and both reliabilities of image and background area are difficult to be compatible. For instance, improvement of both reliabilities of image and background area in an adequate scope are achieved by increasing molecular weight, however such increase of molecular weight makes a steep degradation of color-developing competency. Conversely speaking, by decreasing the molecular weight, color-developing competency can be improved, but both reliabilities of image and background area are decreased. Accordingly, all of oligomer compositions are not always exhibit excellent characteristics like the present invention, but each structural nature thereof leads to a characteristic. From such point of view, it is affirmed that the oligomer of the present invention with its structural natures exhibits specific characteristics distinguished from that of other oligomers.

As mentioned differences between present invention and prior arts in above paragraphs (1) to (4), the existence of compounds such as condensation compound of isocyanate with amine compound or a compound having hydroxyl group, or merely oligomer compound does not lead to characteristics exhibited by oligomer of the present invention, the existence of oligomer composition of molecular structure which has an extent spreading into three dimensional directions, and further, color-developing. competency group is existing at every side ends of structures leads to the exhibition of the specific characteristics (compatibility of both reliabilities of image and background area and improved color-developing competency), and these are realized on account of the oligomer composition of the present invention.

With regard to the oligomer composition of the present invention which shows such specific characteristics, a sure structure of it can be not shown, however by determination of molecular weights of typical compounds which were synthesized in the present invention, results as shown in Table 1 below were recorded, and this Table 1 clearly reveals oligomers obtained by progressed reactions. Further, it is supposed that the obtained oligomers have a structure extending to three dimensional directions because isocyanates used for synthesizing them were tri- or more-valent compounds.

As aforementioned, The oligomer of the present invention means one having a molecular weight in the range of more than 2000 to less than 10000, and among these oligomers, one having a molecular weight in the range of 3000 to 6000 is favorable, and in the range of 4000 to 6000 is more favorable. The reason why one having such molecular weight in the range of 3000 to 6000 is favorable can be considered as follow.

Namely, the oligomer composition of the present invention can exhibit specific characteristics by effects to be considered that the oligomer not only contains urea groups, but also has structures extended to three dimensional directions, and further it has comparatively large molecular weight called as oligomer, and more it has strong color-developing competency groups (OH group and/or COOH group) existed in every side ends of each extended structure, and moreover it has such strong color-developing competency groups in the middle of each structure. On account of this, if the molecular weight decrease to less than 2000, satisfactory function can not be exhibited, namely, color-developed state having sufficiently strong durability for the contact with plasticizer or the like materials are not formed, therefore showing a tendency apt to discolor of image. This tendency becomes to remarkable when the combination use of the oligomer with another conventional type color-developer such as phenollic developer is conducted, that is, in case of oligomer having a molecular weight of less than 2000, it is insufficient to protect the color-developed state by the phenollic developer from attacking of plasticizer. On the other hand, increased molecular weight exhibits sufficient function of plasticizer-proof in image, however there is a tendency that larger molecular causes more declined responsibility for heat radiation, and thus color-developing characteristic (image density and color-developing sensitivity) is decreased. Accordingly, as molecular weight, 10000 or less is favorable, one in the scope of 3000 to 6000 is more favorable from the point of aforementioned durability for plasticizer, and one in the scope of 4000 to 6000 is most favorable. However, in case of the oligomer composition of the present invention, many color-developing competency groups are uniformly distributed in the molecular caused by the structure of source amine compound represented by Formula (II) which contains OH group(s) and/or COOH group(s), therefore if it becomes to be larger molecular weight does not make it significantly inactive in coloring sensitivity and color density itself is also not considerably decreased. This favorable nature is more significant when the source amine compound of Formula (II) has both groups of OH and COOH (for instance amino salicylic acid and the like), color-developing sensitivity together with image density can be held in high level. Favorable molecular weight of the oligomer of the present invention featuring such characteristics is in aforementioned scope (more than 2000 to 10000 or less), but the characteristics themselves are not extremely declined permission and held in allowable level, even if the molecular weight is scale off to the larger side (that is over 10000).

Then, with regard to polyvalent isocyanate of tri- or more-valent one represented by Formula (I) which constitutes the oligomer composition of the present invention, any isocyanate compound having 3 or more isocyanate groups in the molecular can be used alone or in combination. The X in Formula (I) means a tri- or more-valent group, and there is no limitation in its structure, and for examples following ones can be denoted.

As examples of the X, (a) tri- or more-valent group derived from carbonyl groups, sulfonyl groups, aliphatic hydrocarbon, and/or aromatic hydrocarbon, (b) tri- or more-valent group derived from aliphatic hydrocarbon which contains in its main chains one or more hetero atoms carbonyl groups, sulfonyl groups, ester groups, amido groups, urethene groups, and/or aromatic rings, (c) tri- or more-valent group derived from three or more aromatic hydrocarbons combined with aliphatic hydrocarbonic chains which contain in their main chains one or more hetero atoms, carbonyl groups, sulfonyl groups, ester groups, amido groups, urethene groups, and/or alkylene groups, are instanced.

Further, among above described examples of the X, ones which have structures represented by following Formula (III) and (IV) are specially mentioned.

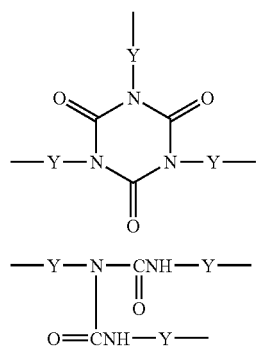

Formula (III)

Formula (IV)

(where Y represents a di-valent group).

Such multi-valent isocyanate of tri- or more-valent one represented by Formula (I) containing the X can be various types ones. These tri- or more-valent isocyanates can be derived from various types di-isocyanate compounds. The di-isocyanate compounds can be included various kinds compounds such as tolylenene-diisocyanate (TDI), 4,4'-diphenylmethane-diisocyanate, polymethylene-polyphenyl-methane-diisocyanate, 1,6-hexamethylene-diisocyanate (HDI), isophorone-diisocyanate, 1,5-naphthlene-diisocyanate, o-,p- and m-xylene-diisocyanates, 4,4'-dicyclohexylmethane-diisocyanate, 2,2,4-trimethyl-hexamethylene-diisocyanate, 1,4-cyclohexyl-diisocyanate, lysine-diisocyanate, 3,3-dimethylbiphenyl-4,4'-diisocyanate, dianisidine-diisocyanate, m- and p-tetramethylene-diisocyanate, and the like diisocyanates. And these diisocyanates various types tri-or more-valent diisocyanates can be prepared by the reaction of these diisocyanates with tri- or more valent poly-alcohols such as trimethylol propane, pentaerythritol, di-pentaerythritol, tri-penta-erythritol and the like, or by trimerization of these diisocyanates, or by biuretization of these diisocyanates.

Specific examples of the multi-valent of Tri- or more-valent isoicyanates used in the present invention include, but not restricted to derivatives derived from 1,6-hexamethylene-diisocyanate, 4,4-diphenylmethane-diisocyanate and 1,4-cyclohexyl-diisocyanate as follows.

I-1

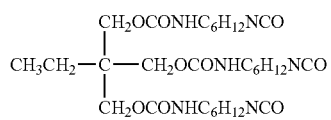

(COLONATE HL manufactured by Nippon Polyurethane Inc.)

I-2

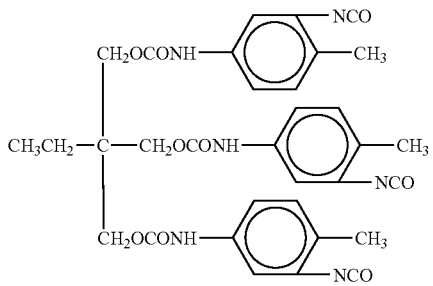

(COLONATE L manufactured by Nippon Polyurethane Inc.)

I-3

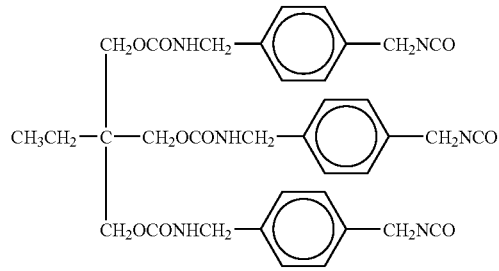

(TAKENATE D110N manufactured by Takeda Corporation)

I-4

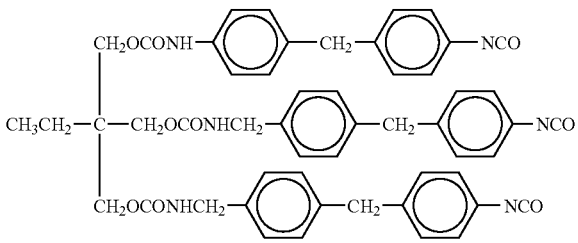

(COLONATE 2067 manufactured by Nippon Polyurethane Inc.)

I-5

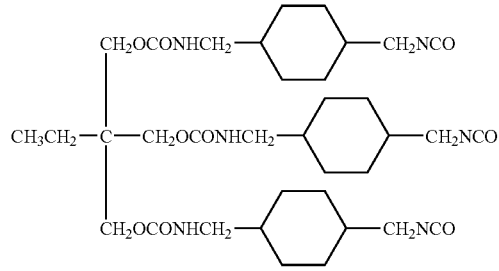

(TAKENATE D120N manufactured by Takeda Corporation)

-continued

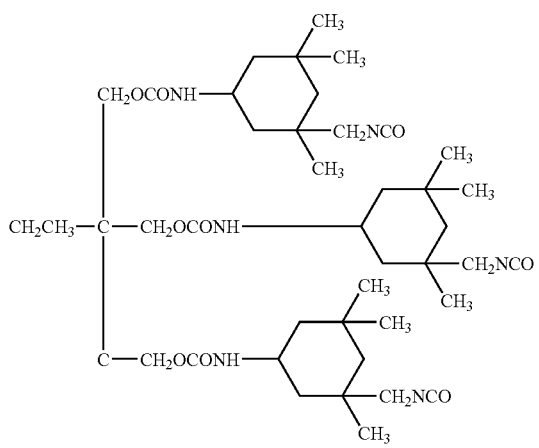

(TAKENATE D140N manufactured by Takeda Corporation)

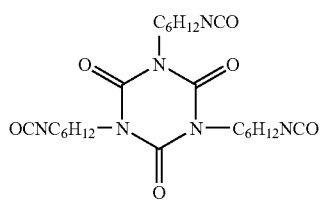

(COLONATE HX manufactured by Nippon Polyurethane Inc.)

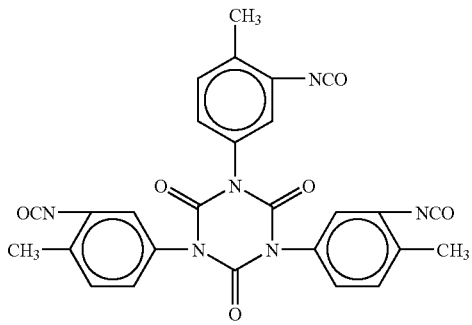

(COLONATE 2030 manufactured by Nippon Polyurethane Inc.)

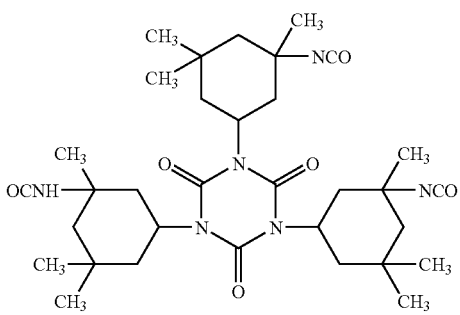

(DESMODULE Z-4470 manufactured by Sumitomo Chemical-Bayer Inc.)

-continued

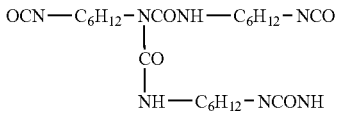

(SUMIDULE N3200 manufactured by Sumitomo Chemical-Bayer Inc.)

Next, specific examples of the aromatic amine represented by formula (II) for constituting the oligomer of the present invention include, but not restricted to, as follows.

Namely, aminophenol derivatives such as 4-aminophenol, 3-aminophenol, 2-aminophenol, 2-amino-3-methylphenol, 2-amino-4-methylphenol, 2-amino-5-methylphenol, 4-amino-2-methylphenol, 3-amino-3-methylphenol, 4-amino-3-methyl-5-animo-2-methoxyphenol, 2-amono-4-t-butylphenol, 2-amino-4-chlorophenol, 6-amino-2,4-dimethylphenol, 4-amono-2,6-dichlorophenol, 6-amono-2,5-dimethylphenol, 4-amono-2,6-dibromophenol, 4-amino2,3-dimethylphenol, 5-amono-1-naphthol, 1-amino-2-naphthol, 4-amino-1-naphthol, 3-amino-2-naphthol; benzoic acid derivatives such as 4-amino benzoic acid, 3-amino benzoic acid, 2-amino benzoic acid(anthranilic acid), 2-amino-3-methylbenzoic acid, 2-amino-6-methylbenzoic acid, 2-amino-5-methylbenzoic acid, 2-amino-3-methxylbenzoic acid, 3-amino-4-methoxybenzoic acid, 2-amino-5-chlorobenzoic acid, 3-mamino-2-methy-benzoic acid, 3-amino-4-methyl-benzoic acid, 4-amino-3-methyl-benzoic acid, 2-amino-3-chlorobenzoic acid, 2-amino-4-chloro benzoic acid, 4-amino-2-chlorobenzoic acid, 5-amino-2-chlorobebzoic acid, 2-amino-5-bromobenzoic acid, 2-amino-5-iodobenzoic acid, 2-amino-4-fluorobenzoic acid, 4-nitroanthranilic acid, 5-nitroanthranilic acid, 3,5-dimethylanthranilic acid, 3,5-dibutylanthranilic acid, 4-amino-3,5-diioiodo anthranilic acid, 4-mino-5-chloro-2-metoxybenzoic acid, 2-amino-4,5-dimethoybenzoic acid, 3-amino-2-naphthoeic acid; salicylic acid derivatives and hydroxybenzoic acid derivatives such as 4-aminosalicylic acid, 5-aminosalicylic acid, 3-aminosalicylic acid, 5-hydroxy anthranilic acid, 3-amino-4-anthranilic acid are included.

The oligomer composition used as color-developer in the present invention is one prepared by condensation polymerization of polyvanent isocyanate compound as tri- or morevalent one represented above described Formula (I) with amine derivative represented above described Formula (II). This oligomer is one formed by above described both compounds, and has a structure extending in the three dimentional directions formed by repeated reaction of isocyanate groups with phenollic OH groups and/or aromatic COOH groups which are being contained in the compound of Formula (II), in addition to the reaction of isocyanates groups with amino groups. Progress details as the subject matters of what tangible selectivities are there isocyanate groups and how much degree of condensations of mutual isocyanate groups are made in all isocyanate groups used as mother elements isocyanate groups and the like, are not clarified yet at the moment. However, the products having surely larger molecular weights were obtained, in comparison with calculated condensation reaction products of isocyanate groups in corresponding polyvalent isocyanate compounds of Formula (I) with equivalent amount of amino compound of Formula (II), and obtained compositions are to be considered ones as the products of more progressed reactions between other functional groups (phenollic OH groups and/or aromatic COOH groups) in the amino compound of Formula (II).

From determinations of molecular weights of these compounds by GPC method, results shown in the Table 1 were obtained, therefore it is clear that the compounds used as color-developer in the present invention are ones made to be oligomers in the structures, from both compounds of Formula (I) and Formula (II).

TABLE 1

| No. | Formula(I) | Formula(II) | Molecular weight |
|---|---|---|---|
| 1 | I-1 | 4-aminobenzoic acid | 3500/2800 |
| 2 | I-1 | 3-aminophenol | 3400/2700 |
| 3 | I-1 | 4-amino salicylic acid | 5600/3500 |
| 4 | I-7 | 4-amino salicylic acid | 4900/3200 |
| 5 | I-10 | 4-amino salicylic acid | 4700/2800 |

This molecular weights are relative ones by GPC method and determined using a polyethylene glycol.

As for the oligomer compositions of the present invention, their characteristics such as molecular weights, distributions of molecular weights, ratio between different color-developing competency groups and so forth characteristics, by adjusting amount of isocyanate groups contained in the compounds (I), reaction ratio thereof with the compound (II) and reaction conditions such as temperature, kind of solvents, concentration, timing for introducing ingredients and use amounts of ingredients by introduction actions and the likes, and compositions prepared with optional conditions can be used.

The synthesis method is described hereinafter, and it can be conducted using optional solvents, in case of ethyl acetate use as aforementioned and described in claims 8 to 10, it treatment operation of the method becomes ease, hence is excellent method in real use.

As for aforementioned oligomer composition of the present invention, in case of its single use, it has an excellent reliabilities of both image and background area and excellent color-developing characteristics too. And furthermore, it has another specific characteristic that the combination use thereof with other color-developer can significantly improve the color-developing natures (color-developing sensitivity and image density), with being held the excellent reliabilities of both image and background area. Examples of the other color-developers in this case include following ones;

4,4'-isopropylidene-bisphenol, 4,4'-bis(o-methylphenol), 4,4'-sec-butylidene-bisphenol, 4,4-isopropylidene-bis(2-ter-butylphenol), p-nitro-benzoic acid zinc salt, 1,3,5-tris(4-ter-butyl-3-hydroxy-2,6-dimethybenzyl)-isocyanurate, 2,2'-(3, 4-dihydroxy phenylpropane), bis(4-hydroxy-3-methylphenylsulfide), 4-(β-(p-methoxypheoxy)ethoxy)-salicylic acid, 1,7-bis(4-hydroxyphenylthio)-3,5-dioxahepthane, phthalic acid-monobenzylester-monocarboxylic acid, 4,4'-cyclohexylidene-bisphenol, 4,4'-isopropylidene-bis(2-chlorophenol), 2,2'-methylene-bis(4-methyl-6-ter-butyl-2-methyl)phenol, 1,1,3-tris(2-methyl-4-hydroxy-5-cyclohexyl)-butane, 4,4'-thio-bis(6-ter-butyl-2-methylphenol), 4,4'-dihydroxy-diphenylsulfone, 4-benzyloxy-47-hydroxyphenylsulfone, 4-isopropyloxy-4'-hydroxy-diphenylsulfone, 4,4'-diphenolsulfoxide, p-hydroxy-benzoic acid-isopropylate, p-hydroxy-benzoic acid benzylester, protocatechu acid-benzylester, gallic acid stearate ester, 1,3-bis (4-hydoroxyphenyl-thio)-propane, 1,3-bis(4-hydroxyphenyl-thio)-2-hydroxy-propane, N,N-diphenyl thiourea, N,N-di(m-chlorophenyl thiourea), salicylic anilinide, 5-chlorosalicylic anilinide, bis(4-hydroxyphenyl)acetic acid methyl ester, bis(4-hydroxyphenyl)acetic acid-benzyl ester, 1,4-bis(4-hydroxycumyl)benzene, 2,4'-dihydroxy-diphenyl-sulfone, 2,2'-diallyl-4,4'-diphenolsulfone, 3,4-di-hydroxy-4'-methyldiphenyl-sulfone, α,α-bis(4-hydroxyphenyl)-α-methylketone, 4,47-thio-bis(2-chlorophenol), and the like.

Among these, together use of 2,4'-dihydroxy-diphenyl-sulfone and 4-isopropyloxy-4'-hydroxy-diphenylsulfone with the oligomer composition are particularly high compatible of color-developing characteristics with both reliabilities of image and background area.

Furthermore, the oligomer composition employed in the present invention is used in the range of 0.5 to 10 parts for leuco dye 100 parts by weight, favorably in the range of 1 to 5 parts. On the other hand, when it is uses together with other color-developer too, the use as both total amount of both developers is also in the range of 0.5 to 10 parts favorably in the range of 1 to 5 parts for leuco dye 100 parts by weight. And combination use of the oligomer composition with other color-developer can be carried out by optional mix ratios, but favorable ratio is an amount in the range of oligomer ingredient 20 to 70% for total color-developers, more favorably 20 to 50%. By such range of small ratios of the oligomer in the mix use with other color-developer, color-developing characteristics and both reliabilities of image and background area are still compatible, thus this is also one of characteristics of the oligomer of the present invention.

Basic dye precursors(leuco dyes) in the present invention can be used alone or in combination, and such leuco dyes can be optional ones which having been applied in conventional thermosensitive materials, and specific examples thereof include following dyes;

3,3-bis(p-dimethylaminophenyl)phthalide,
3,3-bis(p-dimethylaminophenyl)-6-dimethylaminophtalide,
3-diethylamino-6-methyl-7-anilinofluoran,
3-dibutylamino-6-methyl-7-anilinofluoran,
3-N-methyl-N-butylamino-6-methyl-7-anilinofluoran,
3-N-methyl-N-propylamino-6-methyl-7-anilinofluoran,
3-N-ethyl-N-butylamino-6-methyl-7-anilinofluoran,
3-N-ethyl-N-propylamino-6-methyl-7-anilinofluoran,
3-N-methyl-N-amylamino-6-methyl-7-anilinofluoran,
3-N-ethyl-N-amylamino-6-methyl-7-anilinofluoran,
3-N-ethyl-N-isoamylamino-6-methyl-7-anilinofluoran,
3-N-hexyl-N-isoamylamino-6-methyl-7-anilinofluoran,
3-N-methyl-N-cyclohexylamino-6-methyl-7-anilinofluoran,
3-N-ethyl-N-franylmethylamino-6-methyl-7-anilinofluoran,
3-diethyl-N-butylamino-7-dibenylamino-7-(2'-chloroanilino)fluoran,
3-pyrrolidyl-7-dibenzylaminofluoran,
3-diethylamino-6-chloro-7-anilinofluoran,
3-dibutylamino-7-(2'-chloroanilino)fluoran,
3-dibutylamino-7-chlorofluoran,
3-diethylamino-6-methyl-7-chlorofluoran,
3-N-methyl-N-cyclohexylamino-6-chlorofluoran,
3-diethylamino-6-methyl-7-(2'-dimethylanilino)fluoran,
3-diethylamino-7-dibenzylaminofluoran,
3-butylamino-6-chloro-7-(2'-chloroanilino)fluoran,
3-diethylamino-6-ethoxyethyl-7-anilinofluoran, and the like dyes.

Various thermofusible materials as sensitivity improving agent and lubricant can be employed, by alone or in combination. Specific examples of such a lubricant include fatty acids such as stearic acid, behenic acid and other fatty acids; metal salts of fatty acids such as zinc salt of stearic acid, aluminum salt of stearic acid, calcium salt of stearic acid, zinc salt of behenic acid; solid organic materials such as p-benzyl-biphenyl, tarphenyl, triphenyl methane, p-benzyloxy benzoic acid, β-benzyloxy naphthalene, β-naphthoic acid phenyl ester, β-naphthoic acid methyl, 1-hydroxy-2-naphthoic acid phenyl, 1-hydroxy-2-naphthoic acid methyl, diphenyl carbonate, terephthlic acid benzyl, 1,4-dimethoxy naphthalene, 1,4-diethoxy naphthalene, 1,4-dibenzyloxy naphthalene, 1,2-diphenoxy ethane, 1,2-bis(4-methylphenoxy ethane), 1,4-diphenoxy-2-butene, 1,2-bis(4-methoxyphenyl thio)ethane, dibenzoyloxy methane, dibenzoyloxy propane, 1,4-diphenylthio-butnane, 1,4-diphenylthio-2-butene, 1,3-bis(2-vinyloxy-ethoxy)benzene, 1,4-bis(2-vinyloxy-ethoxy)benzene, p-(2-vinyloxy-ethoxy)biphenyl, p-allyloxy biphenyl, dibenzoyloxy methane, dibenzoyloxy propane, dibenzyl disulfide, 1,1-diphenyl ethanol, 1,1-diphenyl propanol, p-benzyloxy benzyl alcohol, 1,3-phenoxy-2-methoxycarbonyl benzene, N-octadecylcarbamoyl benzene, 1,2-bis(4-methoxyphenoxy) propane, 1,5-bis(4-methoxyphenoxy)-3-oxa-pentane, dibenzyl oxalate, oxalic acid bis(4-methylbenzyl), and the like.

When the thermo-sensitive recording material of the present invention is prepared, various kinds of additives other than aforementioned color-developer, leuco dye and thermofusible material may be also incorporated into the recording layer as necessary, which additives are customarily employed in conventional thermosensitive recording materials.

As these example, binder materials for fixing the other used materials onto substrate and the like is for instance included, and they can be employed alone or in combination. Specific examples of such a binder include: water-soluble polymer materials such as polyvinyl alcohol, carboxyl modified polyvinyl alcohol, starch and its derivatives, cellulose derivatives (e.g., methoxy cellulose, hydroxyethyl cellulose, hydroxymethyl cellulose, carboxymethyl cellulose, methyl cellulose, ethyl cellulose, and the like), polyacrylic acid sodium salt, polyvinylpyrrolidone, acrylamide-acrylicacid ester copolymers, acrylamide-acrylate-methacrylic acid ternary copolymers, alkali metal salts of styrene-maleic anhydride copolymers, alkali metal salts of isobutylene-maleic anhydride copolymers, polyacrylamide, modified-polyacrylamide, methylvinylether-maleic anhydride copolymers, carboxyl-modified-polyethylene, polyvinylalcohol-acryl amido block copolymer, alkali metal salts of ethylene-maleic anhydride copolymers, melamine-formaldehyde resin, urea-formaldehyde resin, sodium alginate, gelatin casein and the like;

emulsions of resins such as polyvinyl acetate, styrene-butadiene copolymers, styrene-butadiene-acryl copolymers, polyacrylic acid, polyacrylate ester, polymethacrylate ester, vinyl chloride-vinyl acetate copolymers, polybutyl methacrylate, polyvinylbutyral, polyvinylacetal, ethylene-vinyl acetate copolymers, and the like.

These are employed alone or in combination, and more, crosslinking agent(hardener or curing agent) may be added to cross-link the binder materials as necessary. Specific examples are ones capable of reaction with the binder material, and can be included glyoxal derivatives, methylol derivatives, epichlorohydrin derivatives, epoxy compounds, aziridine compounds and other cross-linking agent.

As another additive, there is instanced a pigment material used in the thermo-sensitive recording material of the present invention, and the pigment materials are capable of employing alone or in combination into the thermo-sensitive recording material, and examples of the pigment materials include inorganic materials such as silica, zinc oxide, titanium oxide, aluminum hydroxide, zinc hydroxide, barium sulfate, clay, kaolin, calcinated kaolin, talc, and surface-treated thereof such as silica and titanium oxide and so forth inorganic materials; and organic fine particles such as particulate urea-formaldehyde resins, particulate styrene-methacrylic acid copolymers, particulate polystyrene resins, particulate polyvinylidenechloride type resin, particulate styrene-methacrylate copolymers, plastic hollow particles.

Further, the thermosensitive recording material of the present invention may be provided a protecting layer onto the thermosensitive color-developing layer for the purpose of improvements of recording head-matching nature and capability for writing, which contains pigment, binder, cross-linking agent, lubricant and the like additives as main ingredients, and in this case, aforementioned pigment, binder, cross-linking agent and lubricant can be used as corresponding each ingredients, alone or by combination.

The thermosensitive recording material of the present invention also may be provided an under layer onto the substrate, which contains as main ingredients pigment and binder, and they are used alone or by combination. And the under layer further may contain particulate consisting of fine particles of plastic material and each particle having a hollow. This plastic fine particle having a hollow is one having plastic shell and inside hollow which contains gas such as air or other gas, and the particle in the particulate having been foamed in bead shape or small ball shape. The hollow degree of the hollow portion in particulate means an average ratio of outer diameter and inner diameter of the particle, and defined by following Equation (I).

Hollow degree (%)=(Outer diameter of a particle/Inner diameter of the particle)×100    Equation (I)

The hollow particulate of plastic material can be prepared from acrylic type resins such as acrylate and acrylonitrile, stylene type resins such as polystylene resin, and their copolymer. In case of using the plastic hollow particulate as the pigment for the under layer, it is possible to add other inorganic pigment, for the purpose of improving head-matching nature.

Further, the thermosensitive recording material of the present invention may also be provided a back layer onto the back side surface of the substrate, which contains as main ingredients pigment and binder, and in this case, also aforementioned pigment, binder, cross-linking agent and lubricant(thermofusible materials) can be used as corresponding each ingredients, alone or by combination.

As the substrate other than usual papers (acidic paper, neutral paper), substrates capable of coating treatment may optionally be employed, for examples synthesized papers, polymer films and other substitutes are instanced.

Among these, synthesized papers and polymer films have smooth surface, therefore coating layer is apt to be applied onto the substrate uniformly, without any provided undercoat layer. This in general causes the result of uniformity in images color-developed. And in case of the present invention, the state of image color-developed influences upon not only image quality but also reliability of the image, accordingly the use of such substrate causes more improved reliability of the image. Namely, transferring mode of thermal energy to the materials responsible in color-development (leuco dye and color developer) becomes to uniform and lesser of heat loss, and thereby more improved reliability of image can be achieved.

The thermosensitive recording material of the present invention may further include other additive ingredients such as surfactant, agent for preventing pressure-coloring than aforementioned ingredients.

The thermosensitive recording material of the present invention is possible to use in various recording processes using thermal printing faculty, and various recording modes can be carried out. For example in addition to the usage such as facsimiles, receipt sheets, tags, also possible usage is a label which being provided adhesive at backside thereof. Especially, the thermosensitive recording material of the present invention shows characteristics that the color-developed image is difficult to discolor the color-developed image, even if it has the adhesive at backside thereof, the discoloring of image is scarce, hence the label exhibits an excellent property as thermosensitive label.

Now, the oligomer composition of the present invention which is used in aforementioned thermosensitive recording material, is specified below.

The oligomer composition is obtained from the reaction of compound (I) with compound (II), which includes Formula (III) and Formula (IV) as specific partial structures of the compound (I), and includes Formula (V) as specific examples of the compound (II).

In usual synthesis methods, reactions are progressed in the homogeneous systems to produce oligomers, therefore solvent having excellent solubility such as for example DMF (dimethyl formamide) is in general employed, and in which the uniformly dissolved product is gradually accumulated, and the reaction, is progressing with a maintained condition, and eventually oligomer composition is obtained. Treatment method of reacted crude in this case may be following procedure.

(1) DMF is removed from the reacted mixture and crude reaction product is concentrated.
(2) The concentrated reaction solution is poured into water (with ice bricks) and stirred to produce crude product.
(3) The crude product is dried.
(4) The crude product is dissolved into a small amount of DMF, hydrochloric acid is added to the DMF solution until coming to acidic state.
(5) The acidic DMF solution is discharged into water, and the liquid is stirred and washed to purify the product.
(6) The washing and stirring in the water are repeated, and this stirring and washing actions are repeated until the obtained product becomes neutral.
(7) then, obtained product is dried.

As shown above, if DMF is used as reaction solution, purification process of reacted solution is multi-steps, thereby this process is disadvantageous in case of assumed mass production.

As compared with the DMF solution process, the synthesis method of the present invention uses ethyl acetate, thus purification is carried out as shown below.

(1) Solvent in reaction mixture is removed from the reacted mixture by filtration or decantation.
(2) Obtained reaction product is washed by ethyl acetate.
(3) then, obtained product is dried.

As shown above, objet oligomer composition can be obtained by simple purification process.

Important points in the synthesis method of the present invention are as follows.

(i) Product is directly picked up as a precipitation from the reaction system, and the picked out product is not lower molecular weight one, but the oligomer composition which has an increased molecular weight equal to or more than that of product obtained from the reacted mixture being progressed using homogeneous reaction system of the DMF solution. In general, oligomer compositions are slightly soluble for organic solvents, therefore it was considered that the oligomer in the present invention also is not dissolved in the ethyl acetate, thus in the course of progressive reaction progress, precipitations were generated with smaller molecular weights in earlier reaction stages, and as a result, small molecular weight of composition was obtained. but as real phenomena in case of the present invention, the obtained is oligomer composition having an increased molecular weight equal to or more than that of product obtained from the reaction using homogeneous reaction system.

(ii) the use of ethyl acetate as solvent in the reaction system makes it possible to dissolve only unreacted source materials, therefore separation of them from reaction product is very easy.

(iii) The recovery of the solvent is possible, and the drying of product is easy too. From such reasons, the synthesis method of the present invention is significantly excellent method in the light of the execution of assumed mass production.

EXAMPLES

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

Preparation of Samples for Examples and Comparative Examples

Mixtures of following compositions were dispersed using magnetic ball mills, and [Liquid A] to [Liquid E] were prepared.

| [Liquid A] = Leuco dye dispersion liquid | |
|---|---|
| 3-N,N-dibutylamino-6-methyl-7-anilinofluoran | 10 parts |
| Polyvinyl alcohol 10% aqueous solution | 10 parts |
| Water | 30 parts |
| [Liquid B] = color-developer dispersion liquid | |
| Color-developer compounds shown in Table 2-1, Table 2-2 | 10 parts |
| Polyvinyl alcohol 10% aqueous solution | 10 parts |
| Water | 30 parts |
| [Liquid C] = pigment dispersion liquid | |
| P603 (silica gel manufactured by Mizusawa Chemical Inc.) | 10 parts |
| Polyvinyl alcohol 10% aqueous solution | 10 parts |
| Water | 30 parts |
| [Liquid D] = lubricant dispersion liquid | |
| Zinc strearate | 10 parts |
| Polyvinyl alcohol 10% aqueous solution | 10 parts |
| Water | 30 parts |

Next, mixture having following composition was stirred and mixed to prepare Liquid E.

| [Liquid E] = Plastic hollow particulate dispersion liquid | |
|---|---|
| Unfoamed plastic particulate (solid 24%, average particle size 3 μm, hollow ratio 90%) | 40 parts |
| Styrene-butadiene copolymer latex | 10 parts |
| Water | 50 parts |

Next, coating liquids for thermosensitive color-developing layer and for under coat layer were prepared using [Liquid A] to [Liquid E] with use ratio shown below.
(Coating liquid for thermosensitive color-developing layer)
[Liquid A]; [Liquid B]; [Liquid C]; [Liquid D]=1:3:3:0.3
(Coating liquid for under coat layer)
[Liquid E]; [Liquid C]=2:1

The coating liquid for under coat layer was coated onto a surface of a commercially available woodfree paper(60 g/m$^2$ weight) so as to make a layer of dried weight of 3 g/m$^2$, to prepare an under coated paper. Then, the coating liquid for thermosensitive color-developing layer was coated onto the surface of the under coated paper so as to make a layer of dried leuco dye weight of 0.5 g/m$^2$, to prepare a thermosensitive layer. Thereafter, a calender treatment was conducted, by imposing a pressure of 20 kg/cm$^2$ to prepare a themosensitive recording material of the present invention.

In case of preparations above mentioned themosensitive recording material, Samples shown in Table 2-2(Example 6 to Example 16, and Comparative Example 9 to Comparative Example 15) used two kinds of color-developers as a mixtured Incase of these Samples, a mixture of two kinds of color-developer may be prepared in the course of preparation [Liquid B] from beginning, instead of each [Liquid B] was prepared then both Liquids were mixed in these Examples.

The prepared thermosensitive recording materials by above mentioned methods were subjected to the examinations as shown below. Results thereof are shown in Table 3-1 and Table 3-2.

<Evaluation of Color-developing Characteristics>
(Measurement of-Coloring Density of Image)

Each Sample of thermosensitive recording materials by Examples and Comparative Examples were loaded in a thermal printing test apparatus equipped with a commercially available thin film head (made by Matsushita Electronic Components Co., Ltd.), and images were formed on each recording material under the conditions that the applied electric power was 0.45 W/dot, the period for one line record was 20 ms/line and the scanning line density was 8.times.3.85 dot/mm, with the pulse width changed to 0.2 msec to 1.2 msec. And color-developed densitied were evaluated by color-developing sensitives, maximum color developed densities which depend upon density values for each pulse widths.

<Storage Stability Test>
According to above mentioned procedure in evaluation of color-developing characteristics, images in the thermosensitive recording materials by Examples and Comparative Examples were formed with the pulse width of 0.9 msec, to prepare Samples for the test, which were subjected to the test includes following items <Plasticizer-proof Test>
Three sheets of polyvinyl chloride films (made by Shinetsu Polymer Inc.) were overlaid on each Sample, and 5 kg weight was imposed on each Sample, which were left at 40° C. for 15 hours, then Samples were picked up and measured image densities and densities in background areas. The coloring density were measured by a McBeth densitometer.

<Humidity Resistance Test>
Test Samples were left in an atmosphere of 40° C.-90% RH, for 15 hours, thereafter, image densities and densities in background areas of Samples were measured using McBeth densitometer, to evaluate humidity resistances of Samples.

<Heat Resistance Test>
Test Samples were left in an atmosphere of 80° C., RH for 15 hours, thereafter, densities in background areas of Samples were measured using McBeth densitometer, to evaluate heat resistances of Samples. These results are shown in Table and Table 3.

TABLE 2-1

| No. | Color-developing compound |
|---|---|
| Ex. 1 | Oligomer composition consisting of I-1 (COLONATE HL) and 3-aminophenol (molecular weight: Mw/Mn = 3400/2700) |
| Ex. 2 | Oligomer composition consisting of I-1 (COLONATE HL) and 4-aminobenzoic acid (molecular weight: Mw/Mn = 3500/2800) |
| Ex. 3 | Oligomer composition consisting of I-1 (COLONATE HL) and 4-aminosalicylic acid (molecular weight: Mw/Mn = 5600/3500) |
| Ex. 4 | Oligomer composition consisting of I-7 (COLONATE HX) and 4-aminosalicylic acid (molecular weight: Mw/Mn = 4900/3200) |
| Ex. 5 | Oligomer composition consisting of I-10 (SUMIDULE N-3200) and 4-aminosalicylic acid (molecular weight: Mw/Mn = 4700/2800) |
| Com. Ex. 1 | 2,4'-bis-hydroxydiphenyl sulfone |
| Com. Ex. 2 | Oligomer composition consisting of pentaerythritol and 4-hydroxybenzoic acid (molecular weight: Mw/Mn = 3400/2500) |
| Com. Ex. 3 | HOOC—⟨⟩—(OH)—NHCONH—C$_6$H$_{12}$—NHCONH—⟨⟩—(OH)—COOH  CH$_3$—⟨⟩—NHCONH—⟨⟩—SO$_2$—⟨⟩—NHCONH—⟨⟩—CH$_3$  ⟨⟩—OOCHN                                                              NHCOO—⟨⟩ |

TABLE 2-1-continued

| No. | Color-developing compound |
|---|---|
| Com. Ex. 5 | Oligomer composition consisting of I-1 (COLONATE HL) and aniline (molecular weight: Mw/Mn = 3000/2300) |
| Com. Ex. 6 | Oligomer composition consisting of I-7 (COLONATE HX) and aniline (molecular weight: Mw/Mn = 2400/1900) |
| Com. Ex. 7 | Tris (2,6-dimethyl-4-tert-butyl-3-hydroxybenzil) isocyanurate |
| Com. Ex. 8 | Oligomer composition consisting of I-2 (COLONATE L) and aniline (molecular weight: Mw/Mn = 2800/2200) |

TABLE 2-2

| No. | Color-developing compound | Ratio of source materials (weight) |
|---|---|---|
| Ex. 6 | Oligomer composition consisting of I-1 (COLONATE HL) and 3-aminophenol (molecular weight: Mw/Mn = 3400/2300)/2,4'-bis-hydroxydiphenyl sulfone | 3/7 |
| Ex. 7 | Oligomer composition consisting of I-1 (COLONATE HL) and 4-aminobenzoic acid (molecular weight: Mw/Mn = 3500/2300)/2,4'-bis-hydroxydiphenyl sulfone | 3/7 |
| Ex. 8 | Oligomer composition consisting of I-1 (COLONATE HL) and 4-aminosalicylic acid (molecular weight: Mw/Mn = 5600/3500)/2,4'-bis-hydroxydiphenyl sulfone | 3/7 |
| Ex. 9 | Oligomer composition consisting of I-7 (COLONATE HX) and 4-aminosalicylic acid (molecular weight: Mw/Mn = 4900/3200)/2,4'-bis-hydroxydiphenyl sulfone | 3/7 |
| Ex. 10 | Oligomer composition consisting of I-10 (SUMIJULE N-3200) and 4-aminosalicylic acid (molecular weight: Mw/Mn = 4700/2800)/2,4'-bis-hydroxydiphenyl sulfone | 3/7 |
| Ex. 11 | Oligomer composition consisting of I-7 (COLONATE HX) and 4-aminosalicylic acid (molecular weight: Mw/Mn = 4900/3200)/4-hydroxy-4'-isopropoxydiphenyl sulfone | 3/7 |
| Ex. 12 | Oligomer composition consisting of I-7 (COLONATE HX) and 4-aminosalicylic acid (molecular weight: Mw/Mn = 4900/3200)/4,4'-bis-hydroxydiphenyl sulfone | 3/7 |
| Ex. 13 | Identical to Ex. 9 | 1/9 |
| Ex. 14 | Identical to Ex. 9 | 2/8 |
| Ex. 15 | Identical to Ex. 9 | 5/5 |
| Ex. 16 | Identical to Ex. 9 | 7/3 |
| Com. Ex. 9 | Oligomer composition consisting of pentaerythritol and 4-hydroxybenzoic acid (molecular weight: Mw/Mn = 3400/2500)/2,4'-bis-hydroxydiphenyl sulfone | 3/7 |
| Com. Ex. 10 | HO—⟨C₆H₄⟩—NHCONH—C₆H₁₂—NHCONH—⟨C₆H₄⟩—OH, HOOC—...—COOH /2,4'-bis-hydroxydiphenyl sulfone 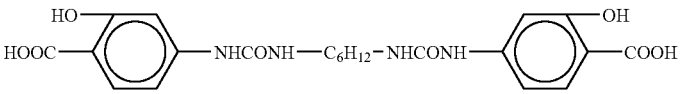 | 3/7 |
| Com. Ex. 11 | CH₃—⟨C₆H₄⟩—NHCONH—⟨C₆H₄⟩—SO₂—⟨C₆H₄⟩—NHCONH—⟨C₆H₄⟩—CH₃ with OOCHN—Ph and NHCOO—Ph substituents /2,4'-bis-hydroxydiphenyl sulfone 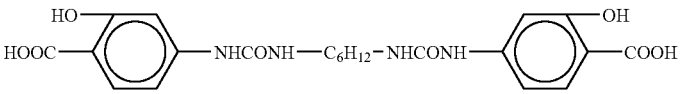 | 3/7 |
| Com. Ex. 12 | Oligomer composition consisting of I-1 (COLONATE HL) and aniline (molecular weight: Mw/Mn = 3000/2300)/2,4'-dihydroxydiphenyl sulfone | 3/7 |
| Com. Ex. 13 | Oligomer composition consisting of I-7 (COLONATE HX) and aniline (molecular weight: Mw/Mn = 2400/1900)/2,4'-bis-hydroxydiphenyl sulfone | 3/7 |
| Com. Ex. 14 | Tris (2,6-dimethyl-4-tert-butyl-3-hydroxybenzil) isocyanurate/2,4'-bis-hydroxydiphenyl sulfone | 3/7 |
| Com. Ex. 15 | Oligomer composition consisting of I-2 (COLONATE L) and aniline (molecular weight: Mw/Mn = 2800/2200)/2,4'-bis-hydroxydiphenyl sulfone | 3/7 |

TABLE 3-1

| | Coloring characteristics | | | | Storability characteristics | | | |
|---|---|---|---|---|---|---|---|---|
| No. | 0.4 ms | 0.7 ms | 1.0 ms | Dmax | Before test | Resistance for plasticizer | Humidity resistance | Heat resistance 80° C. |
| Ex. 1 | 0.10 | 0.47 | 0.74 | 0.81 | 0.72/0.06 | 0.68/0.05 | 0.87/0.12 | 0.69/0.08 |
| Ex. 2 | 0.10 | 0.54 | 0.85 | 0.92 | 0.81/0.06 | 0.75/0.05 | 0.92/0.08 | 0.77/0.07 |
| Ex. 3 | 0.12 | 0.59 | 0.95 | 1.01 | 0.86/0.08 | 0.84/0.07 | 0.92/0.14 | 0.83/0.09 |
| Ex. 4 | 0.11 | 0.52 | 1.05 | 1.12 | 0.83/0.07 | 0.83/0.07 | 0.84/0.10 | 0.83/0.09 |

TABLE 3-1-continued

| | Coloring characteristics | | | | Storability characteristics | | | |
|---|---|---|---|---|---|---|---|---|
| | | | | | Before | Resistance | Humidity | Heat resistance |
| No. | 0.4 ms | 0.7 ms | 1.0 ms | Dmax | test | for plasticizer | resistance | 80° C. |
| Ex. 5 | 0.13 | 0.61 | 0.99 | 1.09 | 0.74/0.07 | 0.79/0.07 | 0.92/0.14 | 0.73/0.09 |
| Com. Ex. 1 | 0.33 | 1.45 | 1.46 | 1.48 | 1.41/0.08 | 0.20/0.06 | 1.29/0.07 | 0.85/0.12 |
| Com. Ex. 2 | 0.17 | 0.80 | 1.10 | 1.12 | 1.12/0.08 | 0.86/0.81 | 1.08/0.42 | 1.01/0.14 |
| Com. Ex. 3 | 0.10 | 0.60 | 0.78 | 1.13 | 0.75/0.07 | 0.50/0.07 | 0.72/0.09 | 0.70/0.07 |
| Com. Ex. 4 | 0.08 | 0.42 | 0.80 | 1.13 | 0.78/0.08 | 0.60/0.10 | 0.83/0.12 | 0.83/0.11 |
| Com. Ex. 5 | 0.11 | 0.45 | 0.69 | 1.06 | 0.64/0.06 | 0.52/0.06 | 0.72/0.10 | 0.47/0.15 |
| Com. Ex. 6 | 0.11 | 0.52 | 0.75 | 1.14 | 0.71/0.06 | 0.51/0.06 | 0.79/0.08 | 0.59/0.15 |
| Com. Ex. 7 | 0.10 | 0.25 | 0.36 | 0.36 | 0.30/0.07 | 0.15/0.06 | 0.28/0.07 | 0.26/0.09 |
| Com. Ex. 8 | 0.11 | 0.40 | 0.70 | 1.00 | 0.68 0.06 | 0.50/0.05 | 0.65/0.10 | 0.50/0.16 |

Storability characteristics: Imagedensity/Density of backgrond area

TABLE 3-2

| | Coloring characteristics | | | | Storability characteristics | | | |
|---|---|---|---|---|---|---|---|---|
| | | | | | Before | Resistance | Humidity | Heat resistance |
| No. | 0.4 ms | 0.7 ms | 1.0 ms | Dmax | test | for plasticizer | resistance | 80° C. |
| Ex. 6 | 0.31 | 1.39 | 1.45 | 1.47 | 1.44/0.08 | 0.81/0.07 | 1.42/0.21 | 1.38/0.18 |
| Ex. 7 | 0.35 | 1.37 | 1.42 | 1.43 | 1.39/0.09 | 0.88/0.06 | 1.38/0.14 | 1.45/0.14 |
| Ex. 8 | 0.32 | 1.38 | 1.42 | 1.43 | 1.40/0.10 | 1.07/0.10 | 1.34/0.20 | 1.39/0.15 |
| Ex. 9 | 0.32 | 1.38 | 1.40 | 1.42 | 1.40/0.09 | 1.15/0.11 | 1.38/0.15 | 1.24/0.14 |
| Ex. 10 | 0.33 | 1.37 | 1.43 | 1.45 | 1.40/0.09 | 1.16/0.09 | 1.38/0.15 | 1.33/0.16 |
| Ex. 11 | 0.45 | 1.41 | 1.44 | 1.45 | 1.43/0.09 | 0.86/0.07 | 1.44/0.09 | 1.46/0.16 |
| Ex. 12 | 0.21 | 1.21 | 1.33 | 1.34 | 1.32/0.11 | 1.02/0.14 | 1.33/0.12 | 1.29/0.14 |
| Ex. 13 | 0.31 | 1.43 | 1.45 | 1.46 | 1.43/0.09 | 0.60/0.07 | 1.39/0.09 | 0.96/0.14 |
| Ex. 14 | 0.29 | 1.41 | 1.43 | 1.45 | 1.42/0.09 | 0.91/0.07 | 1.42/0.09 | 1.08/0.13 |
| Ex. 15 | 0.26 | 1.24 | 1.35 | 1.39 | 1.31/0.09 | 1.12/0.08 | 1.33/0.10 | 1.31/0.14 |
| Ex. 16 | 0.21 | 1.06 | 1.27 | 1.31 | 1.11/0.10 | 1.02/0.08 | 1.16/0.10 | 1.14/0.14 |
| Com. Ex. 9 | 0.30 | 1.37 | 1.41 | 1.42 | 1.41/0.11 | 0.53/0.28 | 1.37/0.30 | 1.21/0.17 |
| Com. Ex. 10 | 0.31 | 1.36 | 1.42 | 1.42 | 1.40/0.11 | 0.40/0.13 | 1.37/0.24 | 1.37/0.40 |
| Com. Ex. 11 | 0.31 | 1.37 | 1.41 | 1.42 | 1.40/0.11 | 0.44/0.14 | 1.38/0.23 | 1.36/0.39 |
| Com. Ex. 12 | 0.30 | 1.38 | 1.43 | 1.43 | 1.44/0.09 | 0.53/0.09 | 1.39/0.20 | 1.34/0.37 |
| Com. Ex. 13 | 0.33 | 1.40 | 1.47 | 1.47 | 1.46/0.10 | 0.46/0.10 | 1.39/0.20 | 1.25/0.41 |
| Com. Ex. 14 | 0.30 | 1.35 | 1.38 | 1.39 | 1.36/0.08 | 0.21/0.07 | 1.30/0.10 | 0.80/0.14 |
| Com. Ex. 15 | 0.30 | 1.38 | 1.40 | 1.42 | 1.40/0.06 | 0.50/0.10 | 1.35/0.20 | 1.30/0.38 |

Storability characteristics: Imagedensity/Density of backgrond area

From the data shown in Table 3-1 and Table 3-2, it is understood that the thermosensitive recording material using the oligomer composition of the present invention is excellent in both reliabilities of image and background area, in addition, color-developing characteristics thereof are significantly increased by combination use with other color-developer. Further, it is understood in case of combination use with 2,4'-dihydroxy diphenyl sulfone that color-developing characteristics and both reliabilities of image and background area are maintained at very high levels. Furthermore, it is also understood that these oligomer compositions are in case of combination use with other color-developer, exhibits the effects even in small ratio of use amount, particularly excellent characteristics are exhibited in the scope of 20 to 50%.

REFERENCE EXAMPLES

The synthesis of the oligomer compositions of the present invention which were used in above mentioned Examples, were conducted using DMF as a solvent, as shown in Reference Examples below.

<Synthesis of Oligomer Used in Example 1

3-aminophenol of 7.64 g(0.07 mol) were dissolved in 80 ml of DMF, then, 17.24 g of isocyanate having a structure shown by I-1 (corresponding to NCO 0.07 mol) dissolved in 50 ml of DMF were drop wisely added to the amine solution. The reaction mixture was stirred for 7 hours at 50° C., then DMF was removed from the mixture, to obtain brown and viscous product mixture. The obtained viscous mixture was stirred in the water 2000 ml, to obtain white solid (S1). This white solid (S1) was dried, then it was again dissolved into 100 ml of DMF, and to the dissolved, concentrated hydrochloric acid of 3 ml were added, thereafter, the obtained was dropped into 2000 ml of water and was stirred, to obtain white solid (S2). This white solid was washed in the water under stirring, until mother liquid was changed to neutral, then it was filtered and dried, to yield final product 12.8 g). Determination of melting point by visual observation revealed a soften state (molten state) of the final product in the range of 100 to 120° C. Molecular weight determination of the final product by GPC revealed result of Mw=3400, Mn=2700.

The molecular weight determinations by GPC method were conducted as follow.
Measuring instrument: SC-8010 system by TOSO company limited.
Column; Shodex OH pak SB-G OH pak SB-806 MH Q×2
Eluent liquid; DMF/0.06 M LiBr/0.04 M H3PO4
Temperature; Column thermostat bath 41° C.
Flow velocity; 1.0 ml/min.
Concentration: approximately 0.1 wt/vol %
Injected amount; 100 µl Synthesis of Oligomer Used in Example 2

Similar procedure as that of Example 1 was conducted, with exception of use of 4-aminobenzoicacid of 8.62 g (0.01 mol) and compound having a structure shown by I-7 (Colonate HL by Nippon polyurethane Co. Ltd) of 4.8 g (NCO 0.01 mol), to yield oligomer composition 12.0 g. Determination of melting point by visual observation revealed a soften state (molten state) of the final product in the range of 210 to 270° C.
Molecular weight determination of the final product by GPC revealed result of Mw=3500, Mn=2800.

Synthesis of Oligomer Used in Example 3

Similar procedure as that of Example 1 was conducted, with exception of use of 4-aminosalicylicacid of 5.36 g (0.035 mol) and compound having a structure shown by I-1 (Colonate HL by Nippon polyurethane Co. Ltd) of 8.62 g (NCO 0.033 mol), to yield oligomer composition 8.1 g. Determination of melting point by visual observation revealed a soften state (molten state) of the final product in the range of 210 to 270° C.
Molecular weight determination of the final product by GPC revealed result of Mw=5600, Mn=3500.

Synthesis of Oligomer Used in Example 4

Similar procedure as that of Example 1 was conducted, with exception of use of 4-aminosalicylicacid of 10.72 g (0.07 mol) and compound having a structure shown by I-7 (Colonate HX by Nippon polyurethane Co. Ltd) of 14.0 g (NCO 0.07 mol), to yield oligomer composition 19.2 g. Determination of melting point by visual observation revealed no clear soften state (molten state) of the final product. Molecular weight determination of the final product by GPC revealed result of Mw=4900, Mn=3200.

Synthesis of Oligomer Used in Example 5

Similar procedure as that of Example 1 was conducted, with exception of use of 4-aminosalicylicacid of 10.72 g (0.07 mol) and compound having a structure shown by I-10 (Sumidule N-3200 by Sumitomo Bayer Urethane Co. Ltd) of 12.85 g (NCO 0.07 mol), to yield oligomer composition 10.7 g. Determination of melting point by visual observation revealed no clear soften state (molten state) of the final product. Molecular weight determination of the final product by GPC revealed result of Mw=4700, Mn=2800.

Compound Used in Comparative Example 1

A commercially available compound was used

Compound Used in Comparative Example 2

An oligomer composition consisting of pentaerythritol and 4-hydroxy benzoic acid which was commercially available (Mw=3400, Mn=2500, was purchased and used.

Compound Used in Comparative Example 3

4-aminosalicylic acid of 9.2 g(0.06 mol) were dissolved in 300 ml of methyethy ketone, then, 5.0 g(0.03 ml) of 1,6-hexamethylene diisocyanate were drop wisely added to the amine solution. The reaction mixture was stirred for 3 hours in 70 to 80° C., then cooled to the room temperature, to precipitate a solid material, this solid was then filtrated to obtain a crude crystalline product This crystalline product was dissolved in 200 ml of DMF, and treated with active carbon, and removed the active carbon from the DMF solution. Then 200 ml of water were added into the DMF solution, to cause again precipitations, to yield light violet color of crystalline 13 g. Determination of melting point by visual observation revealed a soften state (molten state) of the final product in the range of 218 to 220° C.

Compound Used in Comparative Example 4

Synthesis was conducted in accordance of procedure denoted in Example 1 of WO 00/14058 Specification, to obtain object compound.

Compound Used in Comparative Example 5

Similar procedure as that of Example 1 was conducted, with exception of use of aniline of 9.3 g (0.1 mol) and compound having a structure shown by I-1 (Colonate HL by Nippon polyurethane Co. Ltd) of 33.6 g (NCO 0.1 mol), to yield condensation product 30 g. Determination of melting point by visual observation revealed a soften state (molten state) of the final product in the range of 60 to 75° C.

Synthesis of Compound Used in Comparative Example 6

Similar procedure as that of Example 1 was conducted, with exception of use of aniline of 9.3 g (0.1 mol) and compound having a structure shown by I-7 (Colonate HX by Nippon polyurethane Co. Ltd) of 20 g (NCO 0.1 mol), to yield condensation product 27.5 g. Determination of melting point by visual observation revealed a soften state (molten state) of the final product in the range of 70 to 95° C.

Compound Used in Comparative Example 7

Tris(2,6-dimethyl-4-ter-butyl-3-hydroxybenzyl)isoicyanuate having a structure shown below which was commercially available, was purchased and used.

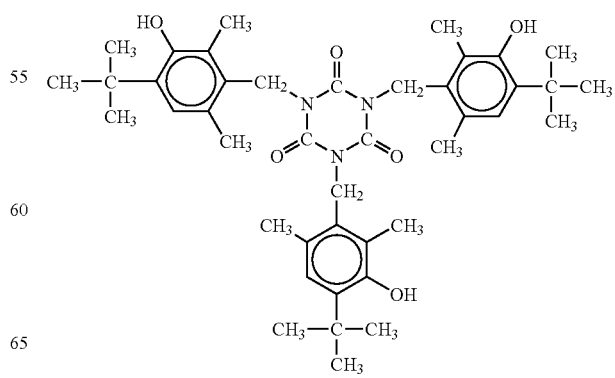

Synthesis of Compound Used in Comparative Example 8

Synthesis was conducted in accordance of similar procedure denoted in WO 00/14058 Specification, to obtain object compound for Comparative Example 8.

Synthesis of Compound Used in Comparative Example 15

Synthesis was conducted in accordance of similar procedure denoted in WO 00/14058 Specification, to obtain object compound for Comparative Example 15.

SYNTHESIS EXAMPLES

Further, the synthesis of the oligomer compositions of the present invention which were also used in above mentioned Examples, were conducted by the synthesis method using ethyl acetate as a solvent, as shown in Synthesis Examples below.

Synthesis of Oligomer Used in Example 1

3-aminophenol of 7.64 g (0.07 mol) were dissolved in 300 ml of ethyl acetate, then, 17.24 g of isocyanate having a structure shown by I-1 (corresponding to NCO 0.07 mol) dissolved in 50 ml of ethyl acetate were drop wisely added to the amine solution. The reaction mixture was stirred for 7 hours with gradually heating to 50° C., at end point of this course, precipitations were appeared in the reaction system, then ethyl acetate solvent was removed from the mixture, to obtain a crude product. The obtained crude product mixture was washed in the ethyl acetate, then filtrated and dried, to obtain 12 g of the final product. Determination of melting point by visual observation revealed a soften state (molten state) of the final product in the range of 100 to 120° C. Molecular weight determination of the final product by GPC revealed result of Mw=3800, Mn=2900.

The molecular weight determinations by GPC method were conducted as follow.
Measuring instrument: SC-8010 system by TOSO company limited.
Column; Shodex OH pak SB-G+ OH pak SB-806 MH Q×2
Eluent liquid; DMF/0.06 M LiBr/0.04 M H3PO4
Temperature; Column thermostat bath 41° C.
Flow velocity; 1.0 ml/min.
Concentration: approximately 0.1 wt/vol %
Injected amount; 100 μl

Synthesis of Oligomer Used in Example 2

Similar procedure as that of Synthesis Example 1 was conducted, with exception of use of 4-aminobenzoic acid of 8.62 g (0.01 mol) and compound having a structure shown by I-1 (Colonate HL by Nippon polyurethane Co. Ltd) of 4.8 g (NCO 0.01 mol), to yield oligomer composition 12.8 g. Determination of melting point by visual observation revealed a soften state (molten state) of the final product in the range of 210 to 270° C.
Molecular weight determination of the final product by GPC revealed result of Mw=3800, Mn=2600.

Synthesis of Oligomer Used in Example 3

Similar procedure as that of Synthesis Example 1 was conducted, with exception of use of 4-aminosalicylic acid of 5.36 g (0.035 mol) and compound having a structure shown by I-1 (Colonate HL by Nippon polyurethane Co. Ltd) of 8.62 g (NCO 0.033 mol), to yield oligomer composition 8.7 g. Determination of melting point by visual observation revealed a soften state (molten state) of the final product in the range of 210 to 270° C.

Molecular weight determination of the final product by GPC revealed result of Mw=5900, Mn=3500.

Synthesis of Oligomer Used in Example 4

Similar procedure as that of Synthesis Example 1 was conducted, with exception of use of 4-aminosalicylic acid of 10.72 g (0.07 mol) and compound having a structure shown by I-7 (Colonate HX by Nippon polyurethane Co. Ltd) of 14.0 g (NCO 0.07 mol), to yield oligomer composition 18.7 g. Determination of melting point by visual observation not revealed clear soften state (molten state) of the final product.

Molecular weight determination of the final product by GPC revealed result of Mw=7600, Mn=3200.

Synthesis of Oligomer Used in Example 5

Similar procedure as that of Synthesis Example 1 was conducted, with exception of use of 4-aminosalicylic acid of 10.72 g (0.07 mol) and compound having a structure shown by I-10 (Sumidule N-3200 by Sumitomo Bayer Nippon Urethane Co. Ltd) of 12.85 g (NCO 0.07 mol), to yield oligomer composition 11.0 g. Determination of melting point by visual observation not revealed a clear soften state (molten state) of the final product.

Molecular weight determination of the final product by GPC revealed result of Mw=5100, Mn=3100.

An evaluation result of the thermosensitive recording material using an oligomer of Example 4 which was synthesized by above mentioned synthesis method of the present invention, is shown as Reference Examples in Table 4 Preparation procedure of the thermosensitive recording material was identical to that of aforementioned Example. (Reference Example 1 was identical to above described Example 4, and Reference Example 2 was identical to above described Example 9)

TABLE 4-1

| No. | Color-developing compound | Ratio of source materials (weight) |
|---|---|---|
| Reference Example 1 | Oligomer composition synthesized by Ex. 4, consisting of I-7 (COLONATE HX) and 4-aminosalicylic acid (molecular weight: Mw/Mn = 7600/3200) | — |
| Reference Example 2 | Oligomer composition synthesized by Ex. 4, consisting of I-7 (COLONATE HX) and 4-aminosalicylic acid (molecular weight: Mw/Mn = 7600/3200)/ 2,4'-dihydroxydiphenyl sulfone | 3/7 |

TABLE 4-2

| | Coloring characteristics | | | | Storability characteristics | | | |
|---|---|---|---|---|---|---|---|---|
| | | | | | Before | Resistance | Humidity | Heat resistance |
| No. | 0.4 ms | 0.7 ms | 1.0 ms | Dmax | test | for plasticizer | resistance | 80° C. |
| Reference Example 1 | 0.12 | 0.55 | 1.05 | 1.11 | 0.96/0.06 | 0.93/0.06 | 0.90/0.08 | 0.94/0.08 |
| Reference Example 2 | 0.33 | 1.37 | 1.40 | 1.40 | 1.38/0.09 | 1.10/0.08 | 1.35/0.11 | 1.23/0.13 |

THE PERFORMANCE OF THE PRESENT INVENTION

As having been obvious from above specified descriptions, the present invention provides a novel thermosensitive recording material which has excellent reliabilities of both image and background area, and also has an excellent color-developing characteristics (color developing sensitivity and image density). Further, it shows an excellent nature in the use together with other developer, and these characteristics are mainly caused from a novel oligomer composition of the present invention Furthermore this invention provides a synthesis method of the oligomer composition.

This patent application claims the benefit of the filing dates, and hereby incorporates by reference herein the contents, of its priority Japanese patent application Nos. 2001-290448 filed Sep. 25, 2001, 2002-020791 filed Jan. 29, 2002, and 2002-215561 filed Jul. 24, 2002.

What is claimed is:

1. A thermosensitive recording material comprising an under layer comprising hollow particles and a thermosensitive layer provided on a substrate in this order, wherein the thermosensitive layer comprises a leuco dye and a color developer, the color developer is an oligomer composition obtained from the reaction of a polyvalent isocyanate compound represented by following Formula (I) with an aromatic amine represented by following Formula (II);

X(NCO)a   Formula (I)

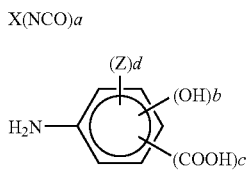   Formula (II)

in which X represents a tri- or more-valent group, a represents an integer numeral of 3 or more, b and c represent respectively integer numerals in the range of 0 to 5 and they satisfy a relation of b+c=1 to 5, Z represents hydrogen atom, alkyl group, allyl group or aryl group, and the aryl group may include condensed ring structure thereof, and d represents an integer numeral in the range of 0 to 4.

2. The thermosensitive recording material according to claim 1, wherein the X in the Formula (I) is tri-valent structure represented by following Formula (III) or Formula (IV):

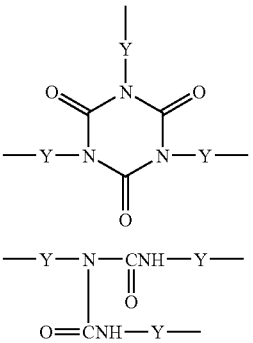   Formula (III)

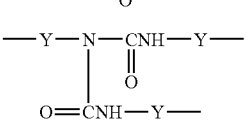   Formula (IV)

where Y represents a di-valent group.

3. The thermosensitive recording material according to claim 1, wherein the aromatic amine represented by the Formula (II) is an amino salicylic acid derivative represented by following Formula (V):

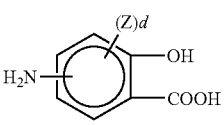   Formula (V)

where Z represents hydrogen atom, alkyl group, allyl group or aryl group, and the aryl group may include condensed ring structure thereof, and d represents an integer numeral in the range of 0 to 4.

4. The thermosensitive recording material according to claim 1, wherein the color developer is a mixture of the oligomer composition and other developer.

5. The thermosensitive recording material according to claim 4, wherein the other developer to be used in combination with the oligomer composition is 2,4'-bis-hydroxydiphenyl sulfone.

6. The thermosensitive recording material according to claim 4, wherein the ratio of the oligomer composition and the other developer is in the range of 2/8 to 5/5 by weight.

7. The thermosensitive recording material according to claim 4, wherein an adhesive layer is being provided on the opposite side of the thermosensitive layer with regard to the under layer.

8. The thermosensitive recording material of claim 1, wherein the hollow particles comprise a plastic shell.

9. The thermosensitive recording material of claim 1, wherein the hollow particles are formed from an acrylic-type resin.

10. The thermosensitive recording material of claim 1, wherein the hollow particles have a bead shape.

11. The thermosensitive recording material of claim 1, wherein the hollow particles have a small ball shape.

12. The thermosensitive recording material of claim 1, wherein each of the hollow particles comprise a holllow central portion, and the hollow central portion contains a gas.

* * * * *